(12) United States Patent
Peana et al.

(10) Patent No.: US 9,898,078 B2
(45) Date of Patent: Feb. 20, 2018

(54) IMMERSIVE ENVIRONMENT CORRECTION DISPLAY AND METHOD

(71) Applicant: DELL PRODUCTS, L.P., Round Rock, TX (US)

(72) Inventors: Stephan Peana, Austin, TX (US); Deeder Aurongzeb, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 122 days.

(21) Appl. No.: 14/594,237

(22) Filed: Jan. 12, 2015

(65) Prior Publication Data

US 2016/0202758 A1    Jul. 14, 2016

(51) Int. Cl.
| | |
|---|---|
| G06F 3/01 | (2006.01) |
| G09G 5/10 | (2006.01) |
| H04N 13/00 | (2006.01) |
| G09G 5/06 | (2006.01) |
| G06F 3/16 | (2006.01) |
| G09G 3/36 | (2006.01) |
| G09G 5/02 | (2006.01) |

(52) U.S. Cl.
CPC .............. G06F 3/013 (2013.01); G06F 3/16 (2013.01); G09G 3/36 (2013.01); G09G 5/02 (2013.01); G09G 5/10 (2013.01); G09G 5/06 (2013.01); G09G 2320/028 (2013.01); G09G 2354/00 (2013.01)

(58) Field of Classification Search
CPC .............. G02B 27/017; H04N 13/044; H04N 13/0037; H04N 9/3182

USPC .......... 345/156, 158, 589, 601, 633; 359/15, 359/614

See application file for complete search history.

(56) References Cited

U.S. PATENT DOCUMENTS

| | | | |
|---|---|---|---|
| 7,623,105 B2 | 11/2009 | Li | |
| 8,115,698 B2 | 2/2012 | Azor et al. | |
| 8,314,767 B2 | 11/2012 | Feg et al. | |
| 8,339,526 B2 | 12/2012 | Minike, Jr. et al. | |
| 2002/0105482 A1* | 8/2002 | Lemelson | G06F 3/0485 345/7 |
| 2005/0117186 A1* | 6/2005 | Li | G02B 27/0093 359/15 |
| 2007/0058118 A1 | 3/2007 | Cirkel et al. | |
| 2007/0070092 A1 | 3/2007 | Oh et al. | |
| 2010/0238101 A1 | 9/2010 | Jhuo et al. | |
| 2012/0223885 A1* | 9/2012 | Perez | G06F 3/011 345/158 |
| 2012/0257036 A1* | 10/2012 | Stenberg | G03B 31/00 348/78 |

(Continued)

*Primary Examiner* — Kimberly A Williams
(74) *Attorney, Agent, or Firm* — Isidore PLLC (57) ABSTRACT

An information handling system (IHS) controls a display for an immersive experience based upon a gazing view of a user. A processor communicates with the display and a gaze detector to detect a relative location of a user to the display. A graphic processing unit (GPU) allocates a field of view on the display based upon the relative location, centers display content in the field of view on the display, and accesses color point control data in response to the allocated field of view. The GPU manages color and brightness of display components of the display according to the accessed color point control data to compensate for variations of color and brightness in a viewing angle of the field of view.

16 Claims, 7 Drawing Sheets

(56) References Cited

U.S. PATENT DOCUMENTS

| | | | | |
|---|---|---|---|---|
| 2012/0259638 A1* | 10/2012 | Kalinli | | G10L 15/25 704/270 |
| 2013/0135366 A1* | 5/2013 | Araki | | G09G 3/3607 345/690 |
| 2013/0201095 A1* | 8/2013 | Dietz | | G06F 3/1454 345/156 |
| 2013/0278499 A1* | 10/2013 | Anderson | | G06F 3/01 345/156 |
| 2013/0304479 A1* | 11/2013 | Teller | | G06F 3/013 704/275 |
| 2013/0329190 A1* | 12/2013 | Lewis | | G02B 27/017 351/246 |
| 2014/0028712 A1* | 1/2014 | Keating | | G06T 19/006 345/633 |
| 2014/0092356 A1 | 4/2014 | Ahn et al. | | |
| 2014/0132629 A1* | 5/2014 | Pandey | | G02B 27/017 345/633 |
| 2014/0146069 A1 | 5/2014 | Tan et al. | | |
| 2014/0198084 A1 | 7/2014 | Peana et al. | | |
| 2014/0204007 A1 | 7/2014 | Peana | | |
| 2014/0313230 A1* | 10/2014 | Suggs | | G06T 3/00 345/648 |
| 2014/0354791 A1* | 12/2014 | Lee | | G06K 9/00228 348/77 |
| 2014/0362180 A1* | 12/2014 | Bickerstaff | | G02B 27/0172 348/43 |
| 2014/0375544 A1* | 12/2014 | Venable | | G06F 3/013 345/156 |
| 2015/0177906 A1* | 6/2015 | Yairi | | G06T 3/0006 345/648 |
| 2015/0278998 A1* | 10/2015 | Jothiswaran | | G06T 3/60 345/650 |
| 2015/0350628 A1* | 12/2015 | Sanders | | G06T 15/08 345/419 |
| 2016/0078592 A1* | 3/2016 | Kim | | G06F 3/013 345/619 |
| 2016/0080874 A1* | 3/2016 | Fullam | | H04R 25/407 381/313 |
| 2016/0091720 A1* | 3/2016 | Stafford | | G02B 27/0172 345/8 |
| 2016/0116745 A1* | 4/2016 | Osterhout | | G02B 27/0176 359/614 |
| 2016/0148554 A1* | 5/2016 | Lim | | G09G 3/20 345/694 |
| 2016/0196794 A1* | 7/2016 | Kim | | G09G 3/3611 345/690 |

\* cited by examiner

IMMERSIVE ENVIRONMENT CORRECTION DISPLAY AND METHOD

BACKGROUND

1. Technical Field

This disclosure generally relates to information handling systems (IHSs) having an immersive display, and more particularly to color management of the immersive display.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The processing capability of IHSs is being employed to provide an immersive environment for a viewer. For example, the immersive environment can be used for interactive visualization that creates a virtual reality (VR). In particular, the visual representation of information by the IHS is presented using an immersive display device such as a stereo display that is subjectively three-dimensional to the viewer. VR can also be characterized by the use of a spatial metaphor, where some aspect of the information is represented in three dimensions and sized appropriately for the subjectively discerned distance so that humans can explore the information as if personally present. The immersive environment can be enhanced by filling as much of the user's field of view as possible, such as with a very large display panel, multiple flat display panels, or a curved display panel.

New display technology that are usable in an immersive environment include In-Plane Switching (IPS) Liquid Crystal Display (LCD) screen technology that was designed to address the main limitations of twisted nematic field effect (TN-effect) matrix LCDs in the late 1980s. These limitations included relatively high response time, strong viewing angle dependence and low-quality color reproduction. IPS involves arranging and switching the orientation of the molecules of the liquid crystal (LC) layer between the glass substrates. In particular, IPS introduces a horizontal liquid crystal orientation to improve on the poor viewing angle and the poor color reproduction. In the IPS substrate, the liquid crystal molecules align parallel to the display instead of perpendicular. This alignment allows light to pass through uniformly, giving IPS LCD screen technology its characteristic wide viewing angles and good color reproduction.

Although an improvement over previous LCD screen technology, generally-known screen technologies continue to have a noticeable brightness and color shift when the display is viewed off-angle. The subjective field of view of a curved display will be skewed for a viewer who is at a shifted viewing angle. The portion of image closer to the viewer will be horizontally compressed, degrading immerseness.

BRIEF SUMMARY

The illustrative embodiments of the present disclosure contemplate that typical color and brightness shifts are display design dependent. Therefore, once the display design and tuning is completed, these shifts are locked in. Display engineering uses optical tools to broadly characterize these shifts in order to create engineering specifications that ultimately define the display component capability. The present innovation addresses these locked in display characteristics by color management compensation of color shift and brightness in order to maintain a consistent user's visual performance regardless of the viewing location.

According to at least one aspect of the present disclosure, an information handling system (IHS) controls a display for an immersive experience based upon a gazing view of a user. A processor communicates with the display and a gaze detector to detect a relative location of a user to the display. A graphic processing unit (GPU) allocates a field of view on the display based upon the relative location. The GPU centers display content in the field of view on the display. The GPU accesses color point control data in response to the allocated field of view. The GPU manages color and brightness of display components of the display according to the accessed color point control data to compensate for variations of color and brightness in a viewing angle of the field of view.

According to at least one aspect of the present disclosure, a computer-implemented method is provided of controlling a display for an immersive experience based upon a gazing view of a user. In one or more embodiments, the method includes a gaze detector detecting a relative location of a user to a display. A GPU allocates a field of view on the display based upon the relative location. The method includes centering display content in the field of view on the display. The method includes accessing color point control data in response to the allocated field of view. The method also includes managing color and brightness of display components of the display according to the accessed color point control data to compensate for variations of color and brightness in a viewing angle of the field of view.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The present disclosure provides an information handling system (IHS) that controls a display for an immersive experience based upon a gazing view of a user. A processor communicates with the display and a gaze detector to detect a relative location of a user to the display. A graphic processing unit (GPU) allocates a field of view on the display based upon the relative location. The GPU centers display content in the field of view on the display. The GPU accesses color point control data in response to the allocated field of view. The GPU manages color and brightness of display components of the display according to the accessed color point control data to compensate for variations of color and brightness in a viewing angle of the field of view.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
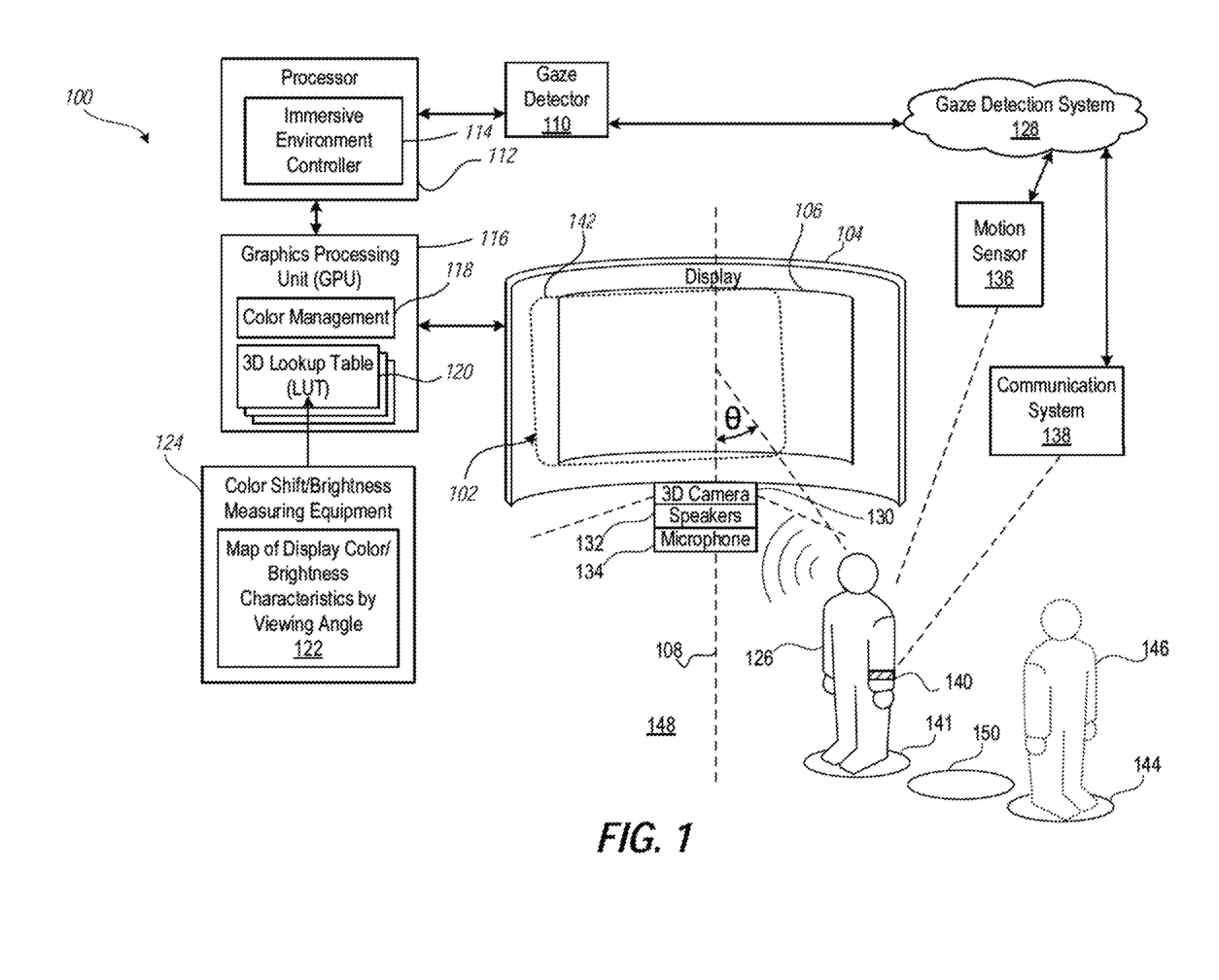
FIG. 1 illustrates a diagrammatic view of an information handling system (IHS) that corrects color management of an immersive display for a viewing angle of a user, according to one or more embodiments.

FIG. 1 illustrates a block diagram representation of an example IHS 100 that presents graphical information 102 on a display 104 that can present an immersive environment in a centered field of view 106 when viewed along a central axis 108. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The IHS 100 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

With continued reference to FIG. 1, the IHS 100 can include a gaze detector 110, a processor 112 that executes an immersive environment controller 114, a Graphics Processing Unit (GPU) 116 that executes a color management component 118 based upon color point control data contained in 3D lookup tables (LUT) 120. The color management component 118 can be software such as; eeColor, Pixelworks, and Portrait Displays that recalculate each pixel value (color and brightness) relative to the viewer location.

The Original Equipment Manufacturer (OEM) can provision the IHS 100 with the 3D LUTs 120 by creating a map 122 of display color/brightness characteristics as a function of viewing angle using color shift/brightness measuring equipment 124. Immersive environment correction can be based upon interpupillary distance (IPD), which is the horizontal distance between the eyes of the user for depth perception purposes. Total field of view (FOV) is the total angular size of the displayed image visible to both eyes. For curved displays, the correction can take into consideration the curvative and direct viewing.

The IHS 100 can include, or be interfaced via the gaze detector 110 to, one or more different modes of interacting with a user 126. In particular, an additional or dedicated function of various components that are present near the user 126 can form a decentralized gaze detection system 128 that includes one or more of a three-dimensional (3D) camera 130, audio speakers 132, a directional microphone or triangulating microphones 134, motion sensor 136, and a communication system 138 that can locate a communication device 140 carried by the user 126.

The user 126 at a first relative location 141 views the centered field of view 106 on the display 104 at an angle θ to the central axis 108. Depending on the screen technology of the display 104 and the specific viewing angle θ, the user 126 would generally notice a color shift and change in brightness from the central axis 108 that can impair the immersive experience. However, the IHS 100 includes the immersive environment controller 114 that directs the color management component 118 of GPU 116 to compensate for the color shift and change in brightness and to subjectively center the graphical information 102 on a portion of the display 104 that presents the most perpendicular surface as an offset field of view 142.

The immersive environment controller 114 that is executed on the processor 112 can dynamically determine a second relative location 144 of the same user 126 at a subsequent time or of another user 146 that is contemporaneously within a viewing space 148 of the display 104. The immersive environment controller 114 can determine which of more than one candidate user 126, 146 is the one for which color management is to be performed. Alternatively, the immersive environment controller 114 can determine a compromise location 150 for color management that is an average of the two locations 141, 144. Thus, the color shift and brightness can be values that are an average, respectively, for each of user locations. For clarity, only two users 126, 146 and their locations are illustrated in a horizontal plane. The immersive environment controller 114 can accommodate more than two users 126, 146. The immersive environment controller 114 can also determining a three-dimensional location of the eyes or the head of each user 126, 146. In one or more embodiments, the color management can be based on the relative three dimensional vector to the eyes or the head of each user 126, 146. In one or more embodiments, the color management can be based on a single horizontal angle relative to the central axis 108 of the display 104.

In at least one embodiment, the viewer location is determined by an image camera that detects where the user is and determines the display viewing angle at that location. The viewer location is fed to the system, such as to GPU 116 and/or color management component 118 (eeColor) to adjust display image performance for each pixel for each image to be refreshed. Also the viewer tracking and screen performance adjustment can be user enabled or disabled. In the case of two displays or a curve display, there can be two viewing angles that are different when the viewer is not centered, therefore the image can be divided in two and adjusted accordingly. Alternatively, additional eye reading/s can be performed to establish which field of view is being currently looked at by the user. With this information, the screen or part of the screen that is being viewed can be adjusted accordingly. Alternatively, in case of multiple users viewing the same screen, the present innovation can include either disconnecting the tracking function or identifying an average color and brightness shift based on the multiple user locations.

In certain instances, the immersive environment controller 114 can determine that a type of graphical information 102 warrants centering the field of view, regardless of where the user 126 is positioned. Stability of the presentation or graphical processing efficiencies can be factors. Exceptions to centering for immersiveness can include static 3D images, movies, moving within a gaming world environment, and manipulating objects within a gaming world environment.

The immersive environment controller 114 can also be enabled or disabled by the user 126. The immersive environment controller 114 can also determine that the number of viewers or the separation of the multiple viewers is too great to create a compromise correction. In addition, the user 126 can be too far away from the display 104 and thus have an IPD that is too small to benefit from immersiveness.

Figure 2:
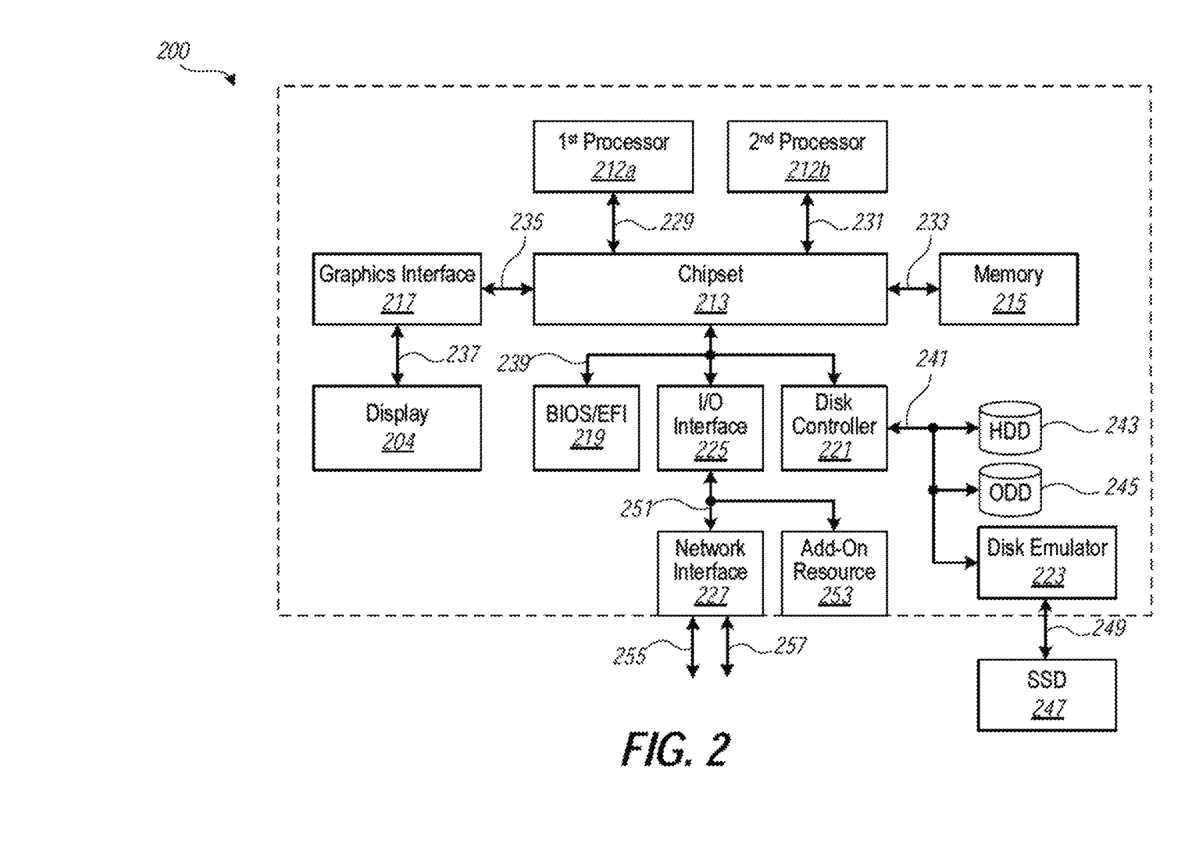
FIG. 2 illustrates a block diagram of an exemplary Graphics Processing Unit (GPU) of the IHS of FIG. 1, according to one or more embodiments.

FIG. 2 illustrates that a generalized embodiment of an IHS 200 can include devices or modules that embody one or more of the devices or modules described above, and operates to perform one or more of the methods described herein. IHS 200 includes first and second processors 212a and 212b, a chipset 213, a memory 215, a graphics interface 217, a basic input and output system/extensible firmware interface (BIOS/EFI) module 219, a disk controller 221, a disk emulator 223, an input/output (I/O) interface 225, and a network interface 227. Processor 212a is connected to chipset 213 via processor interface 229, and processor 212b is connected to the chipset 213 via processor interface 231. Memory 215 is connected to chipset 213 via a memory bus 233. Graphics interface 217 is connected to chipset 213 via a graphics interface 235, and provides a video display output 237 to a display 204. In a particular embodiment, IHS 200 can include separate memories that are dedicated to each of processors 212a and 212b via separate memory interfaces. An example of memory 215 can include random access memory (RAM) such as static RAM (SRAM), dynamic RAM (DRAM), non-volatile RAM (NV-RAM), or the like, read only memory (ROM), another type of memory, or a combination thereof.

BIOS/EFI module 219, disk controller 221, and I/O interface 225 are connected to chipset 213 via an I/O channel 239. An example of I/O channel 239 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 213 can also include one or more other I/O interfaces, including an Industry Standard Architecture (ISA) interface, a Small Computer Serial Interface (SCSI), an Inter-Integrated Circuit (I2C) interface, a System Packet Interface (SPI), a Universal Serial Bus (USB), another interface, or a combination thereof. BIOS/EFI module 219 includes BIOS/EFI code operable to detect resources within IHS 200, to provide drivers for the resources, initialize the resources, and access the resources. BIOS/EFI module 219 includes code that operates to detect resources within IHS 200, to provide drivers for the resources, to initialize the resources, and to access the resources.

Disk controller 221 includes a disk interface 241 that connects the disc controller to a hard disk drive (HDD) 243, to an optical disk drive (ODD) 245, and to disk emulator 223. An example of disk interface 241 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 223 permits a Solid-State Drive (SSD) 247 to be connected to IHS 200 via an external interface 249. An example of external interface 249 includes a USB interface, an IEEE 1394 (Firewire) interface, a proprietary interface, or a combination thereof. Alternatively, SSD 247 can be disposed within IHS 200.

I/O interface 225 can include a peripheral channel 251 that connects the I/O interface 225 to an add-on resource 253 and to network interface 227. Peripheral channel 251 can be the same type of interface as I/O channel 239, or can be a different type of interface. As such, I/O interface 225 extends the capacity of I/O channel 239 when peripheral channel 251 and the I/O channel 239 are of the same type, and the I/O interface 225 translates information from a format suitable to the I/O channel 239 to a format suitable to the peripheral channel 251 when they are of a different type. Add-on resource 253 can include a data storage system, an additional graphics interface, a network interface card (NIC), a sound/video processing card, another add-on resource, or a combination thereof. Add-on resource 253 can be on a main circuit board, on a separate circuit board or add-in card disposed within IHS 200, a device that is external to the IHS 200, or a combination thereof.

Network interface 227 represents a Network Interface Card (NIC) disposed within IHS 200, on a main circuit board of the IHS 200, integrated onto another component such as chipset 213, in another suitable location, or a combination thereof. Network interface 227 can include network channels 255 and 257 that provide interfaces to devices that are external to IHS 200. In a particular embodiment, network channels 255 and 257 are of a different type than peripheral channel 251 and network interface 227 translates information from a format suitable to the peripheral channel to a format suitable to external devices. An example of network channels 255 and 257 includes Infini-Band channels, Fibre Channel channels, Gigabit Ethernet channels, proprietary channel architectures, or a combination thereof. Network channels 255 and 257 can be connected to external network resources (not illustrated). The network resource can include another information handling system, a data storage system, another network, a grid management system, another suitable resource, or a combination thereof.

Figure 3:
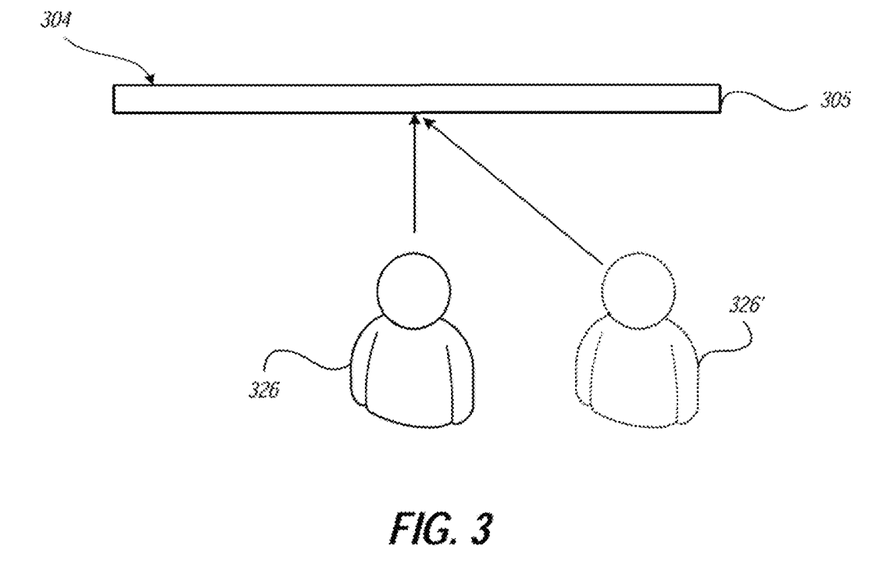
FIG. 3 illustrates a diagrammatic top view of a user at two viewing angles to an immersive display of a single flat display panel, according to one or more embodiments.
Figure 4:
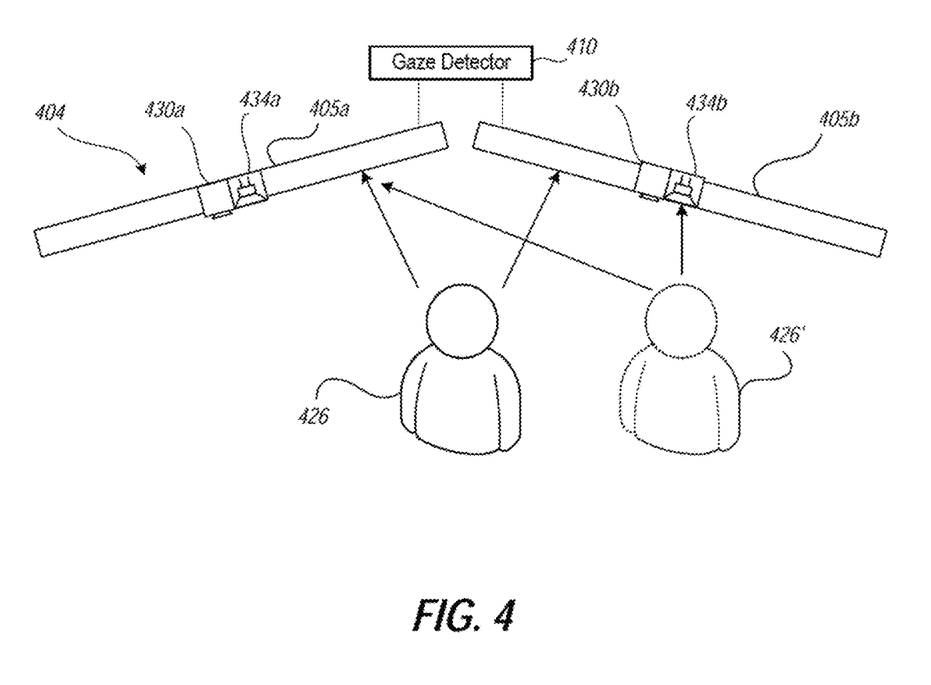
FIG. 4 illustrates a diagrammatic top view of a user at two viewing angles to an immersive display that is functionally formed by two flat display panels, according to one or more embodiments.

FIG. 3 illustrates a user 326, 326' at two viewing angles, respectively, to an immersive display 304 of a single flat display panel 305. Because the display panel 305 is flat, subjectively centering of the image is not required, whereas color and brightness correction can be required. FIG. 4 illustrates a user 426, 426' at two viewing angles, respectively, to an immersive display 404 that is functionally formed by two flat display panels 405a, 405b. Centering the field of view can include centering the field of view wholly on the flat display panel 405a that is farther away from and more perpendicular to the user 426'. Flat display panel 405a includes a two-dimensional (2D) camera 430a and a microphone 434a. Flat display panel 405b includes a 2D camera 430b and a microphone 434b. Gaze detector 410 can locate the user 426, 426' with sensor data from two or more of the available sensors. In one embodiment, the gaze detector 410 can receive angular directions from two spatially separated sensors and perform triangulation. For example, the gaze detector 410 can receive angular directions from 2D cameras 430a, 430b on respective flat display panels 405a, 405b to triangulate and locate the user 426, 426'. The sensors can be of different types. For another example, user 426' can be out of the camera view of camera 430b with flat display panel 405B oriented in an immersive position with flat display panel 405a. User 426' can also be too far away from microphone 434a to be detected. Gaze detector 410 could receive sensor information then from camera 430a and microphone 434b on respective flat display panels 405a, 405b to provide relative angular direction to the user 426'. In one embodiment, one sensor can detect direction and another can sense depth based on image size or change in auditory volume. Thus, two sensors of different types on the same display panel, such as 2D camera 430a and microphone 434a on flat display panels 405a, can also perform location sensing of user 426, 426'. The camera 430a can detect angular bearing and the microphone 434a can detect a change in amplitude, for instance, that provides depth information.

Figure 5:
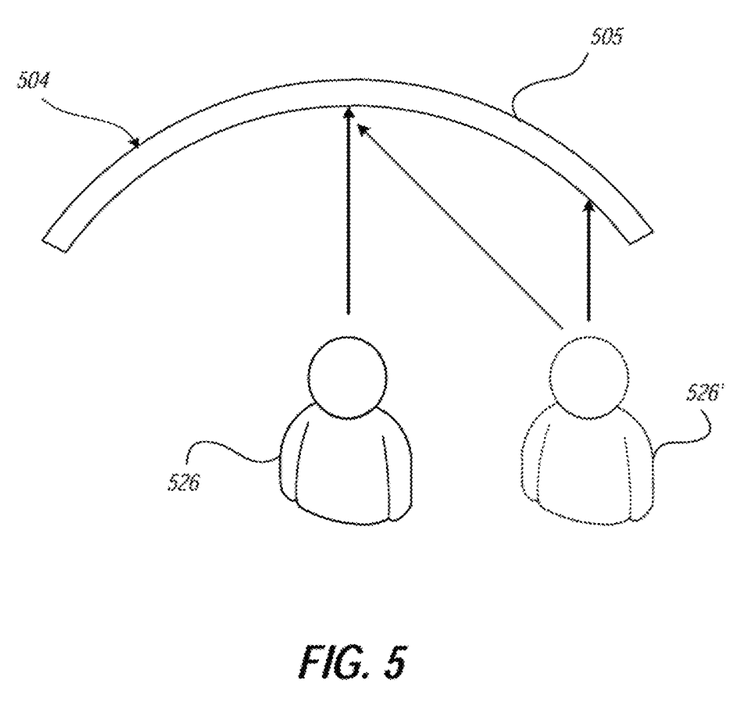
FIG. 5 illustrates a diagrammatic top view of a user at two viewing angles to an immersive display of a single curved display panel, according to one or more embodiments.

FIG. 5 illustrates a user 526, 526' at two viewing angles, respectively to an immersive display 504 of a single curved display panel 505. Centering the field of view can include calculating a number of pixels that subjectively comprise a subjective horizontal dimension width of a pixel. The subjective horizontal width is a function of the angle to the user 526' and the distance from the user 526' since the right side of the display is closer and more tangential. Thus, the subjective horizontal dimension width of a pixel can be more than one physical pixel or less than one physical pixel with the image stretched or compressed accordingly at that coordinate.

Figure 6A:
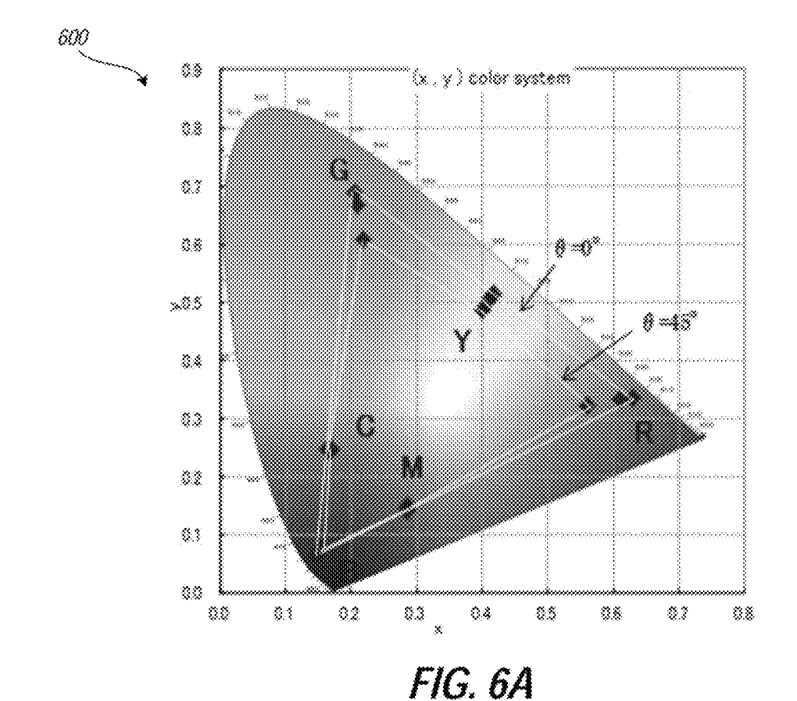
FIG. 6A illustrates a generally-known graphical plot of display color shift between 0° and 45° viewing angles for a Vertical Alignment (VA) LCD display technology.

FIG. 6A illustrates a graphical plot 600 of a display color shift between 0° and 45° viewing angles for a Vertical Alignment (VA) LCD display technology. Vertical-alignment displays are a form of LCDs in which the liquid crystals naturally align vertically to the glass substrates. When no voltage is applied, the liquid crystals remain perpendicular to the substrate, creating a black display between crossed polarizers. When voltage is applied, the liquid crystals shift to a tilted position, allowing light to pass through and create a gray-scale display depending on the amount of tilt generated by the electric field. A VA LCD has a deeper-black background, a higher contrast ratio, a wider viewing angle, and better image quality at extreme temperatures over traditional twisted-nematic display.

Figure 6B:
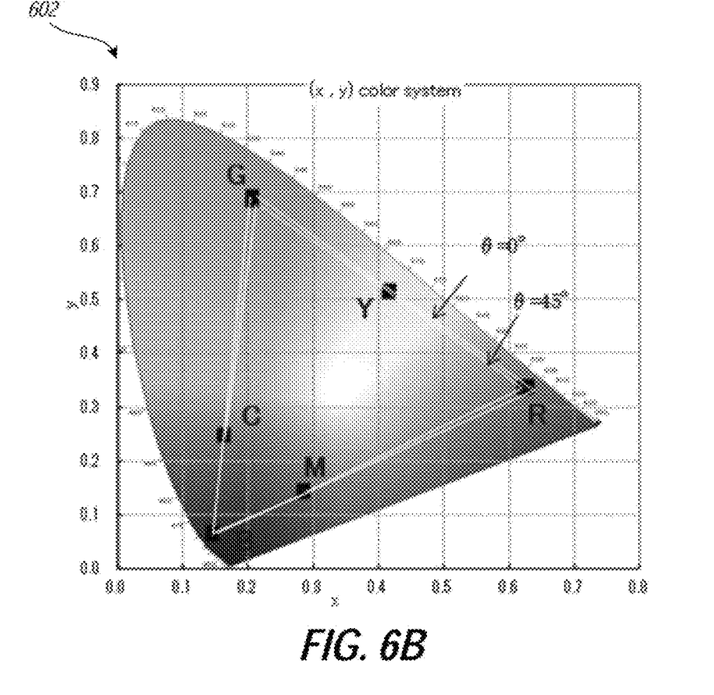
FIG. 6B illustrates a generally-known graphical plot of display color shift between 0° and 45° viewing angles for In-Plane Switching (IPS) LCD display technology.

FIG. 6B illustrates a graphical plot 602 of display color shift between 0° and 45° viewing angles for In-Plane Switching (IPS) LCD display technology. LCD devices use liquid crystal materials and polarization of light to create a light valve. Most popular LCDs are Twisted Nematic (TN) devices, as they contain liquid crystal molecules that are electrically aligned to a predetermined grooved surface. When voltage is applied across the structure the molecules will twist or un-twist allowing the polarized light to pass through or be blocked. By controlling the voltage applied across the liquid crystal layer in each pixel, light is allowed to pass through in varying amounts. The downside of TN LCD technology is that liquid crystal molecules are not always twisting uniformly across a pixel or across the display surface, therefore there are noticeable color shifts when viewing the display off angle.

Figure 7:
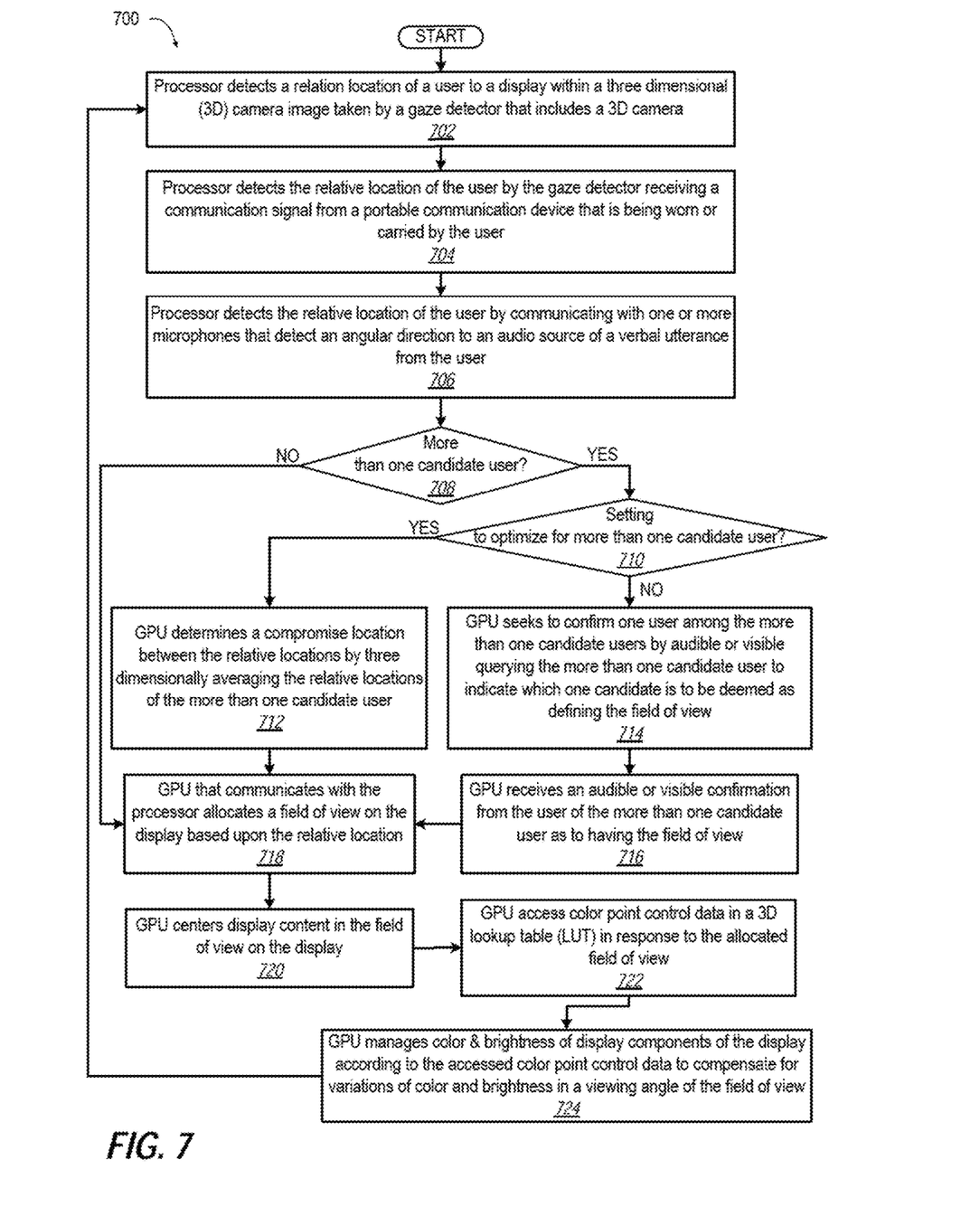
FIG. 7 illustrates a flow diagram of a method of controlling color management of a display for an immersive experience based upon a gazing view angle of a user, according to one or more embodiments.

FIG. 7 illustrates a computer-implemented method 700 of controlling color management of a display for an immersive experience based upon a gazing view angle of a user. In one embodiment, the method 700 includes a processor communicating with a gaze detector to detect a relative location of a user to a display by one or more location-related sensors. In one embodiment, the processor detects the relative location of the user to the display within a three dimensional (3D) camera image taken by a gaze detector that includes 3D camera/s, such as paired stereoscopic cameras or an optical camera with depth sensing (block 702). In one embodiment, the processor detects the relative location of the user by the gaze detector receiving a communication signal from a portable communication device that is being worn or carried by the user (block 704). In one embodiment, processor detects the relative location of the user by communicating with one or more microphones that detect an angular direction to an audio source of a verbal utterance from the user (block 706).

In one or more embodiments, the processor determines whether more than one candidate user is detected within the field of view of the display (decision block 708). In response to determining in decision block 708 that more than one candidate user is detected, then the processor makes a further determination as to whether a system setting is set to optimize for more than one user (decision block 710). In response to the processor determining in decision block 710 that the system setting is set to optimize for more than one user, then the processor determines a compromise location between the relative locations by three dimensionally averaging the relative locations of the more than one candidate user (block 712). In response to determining in decision block 710 that the system setting is not set to optimize for more than one user, then the processor seeks to confirm one user among the more than one candidate users by audible or visible querying the more than one candidate user to indicate which one candidate is to be deemed as defining the field of view (block 714). The processor receives an audible or visible confirmation from the user of the more than one candidate user as to having the field of view (block 716).

Thus, the processor determines the relative location in response to the determination in decision block 708 that only one candidate user is detected. Alternatively, the relative location is determined as the compromise location in block 712. As an additional alternative, the relative location is determined by confirming one user of more than one user in blocks 714, 716. After any one of these three determinations, then method 700 includes a GPU communicating with the processor to allocate a field of view on the display based upon the relative location received from the processor (block 718). The GPU centers display content in the field of view on the display (block 720). The GPU accesses color point control data in a 3D lookup table (LUT) in response to the allocated field of view (block 722). The GPU manages color and brightness of display components of the display according to the accessed color point control data to compensate for variations of color and brightness in a viewing angle of the field of view (block 724). Then method 700 returns to block 702 to dynamically repeat each frame of video processing by the GPU to maintain the immersive experience of the user.

Figure 8:
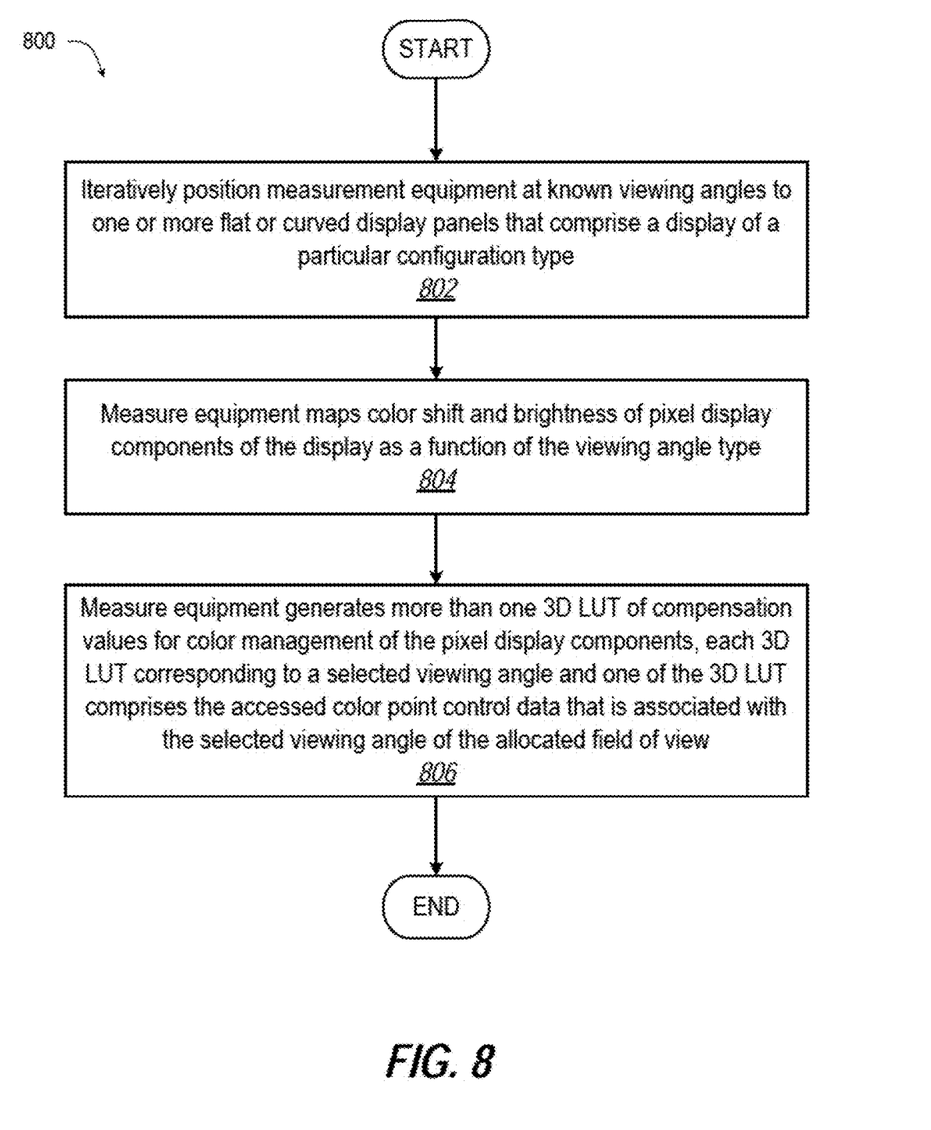
FIG. 8 illustrates a flow diagram of a method of an Original Equipment Manufacturer (OEM) provisioning an IHS to perform color correction of a display for an immersive experience across different viewing angles, according to one or more embodiments.

FIG. 8 illustrates a flow diagram of a method 800 for an Original Equipment Manufacturer (OEM) to provision an IHS for an immersive experience across different viewing angles. In one embodiment, the method 800 includes iteratively positioning measurement equipment at known viewing angles to one or more flat or curved display panels that comprise a display of a particular configuration type (block 802). The method 800 includes the measuring equipment mapping color shift and brightness of pixel display components of the display as a function of the viewing angle (block 804). The measuring equipment generates more than one 3D LUT of compensation values for color management of the pixel display components. Each 3D LUT corresponds to a selected viewing angle. One of the 3D LUT includes the accessed color point control data that is associated with the selected viewing angle of the allocated field of view (block 806).

In the above described flow charts of FIG. 7-8, one or more of the methods may be embodied in an automated controller that perform a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
a display comprising an array of more than one display panel each comprising a gaze detection sensor;
a gaze detector that synthesizes information from the gaze detection sensors to detect the relative location of the user;
a processor that communicates with the display and the gaze detector to:
detect a relative location of a user to the display; and
a graphic processing unit (GPU) that communicates with the processor and the display to:
allocate a field of view on the display based upon the relative location;
center display content in the field of view on the display;
access color point control data in response to the allocated field of view; and
manage color and brightness of display components of the display according to the accessed color point control data to compensate for variations of color and brightness in a viewing angle of the field of view.

2. The IHS of claim 1, wherein:
the gaze detector comprises a three-dimensional camera to produce a three-dimensional camera image; and
the processor detecting the relative location of the user comprises the processor detecting the user within the three-dimensional camera image.

3. The IHS of claim 1, wherein the processor detects the relative location of the user by:
detecting more than one candidate user within a viewing area of the display;
querying the more than one candidate user to indicate which one candidate is to be deemed as defining the field of view; and
receiving confirmation from the user of the more than one candidate user as having the field of view.

4. The IHS of claim 1, wherein the processor detects the relative location of the user by:
detecting relative locations of more than one candidate user within a viewing area of the display; and
determining a compromise location between the relative locations by three dimensionally averaging the relative locations of the more than one candidate user.

5. The IHS of claim 1, wherein the processor detects the relative location of the user by receiving a communication signal from a portable communication device that is being worn or carried by the user.

6. The IHS of claim 1, further comprising one or more microphones that detect an angular direction to an audio source, wherein the processor is electronically connected to the one or more microphones and detects the relative location of the user by receiving the angular direction based on a verbal utterance from the user that is detected by the one or more microphones.

7. The IHS of claim 1, further comprising a measuring device that:
maps color shift and brightness of pixel display components of the display as a function of viewing angle; and
generates more than one three-dimensional (3D) look up table (LUT) of compensation values for color management of the pixel display components, wherein each 3D LUT corresponds to a selected viewing angle and one of the 3D LUT comprises the accessed color point control data that is associated with the selected viewing angle of the allocated field of view.

8. The IHS of claim 1, wherein the display comprises a curved display panel and the GPU manages color and brightness of display components, while taking a curvative and direct viewing of the curved display panel into consideration to make a correction.

9. A computer-implemented method of controlling a display for an immersive experience based upon a gazing view of a user, the method comprising:
a processor communicating with a gaze detector for detecting a relative location of a user to a display, the display comprising an array of more than one display panel each comprising a gaze detection sensor, wherein the gaze detector synthesizes information from the gaze detection sensors to detect the relative location of the user; and
a graphic processing unit:
allocating a field of view on the display based upon the relative location;
centering display content in the field of view on the display;
accessing color point control data in response to the allocated field of view; and
managing color and brightness of display components of the display according to the accessed color point control data to compensate for variations of color and brightness in a viewing angle of the field of view.

10. The method of claim 9, wherein the processor detecting the relative location of the user comprises detecting the user within a three-dimensional camera image.

11. The method of claim 9, wherein the processor detecting the relative location of the user comprises:
detecting more than one candidate user within a viewing area of the display;
querying the more than one candidate user to indicate which one candidate is to be deemed as defining the field of view; and
receiving confirmation from the user of the more than one candidate user as to having the field of view.

12. The method of claim 9, wherein the processor detecting the relative location of the user comprises:
detecting relative locations of more than one candidate user within a viewing area of the display; and
determining a compromise location between the relative locations by three dimensionally averaging the relative locations of the more than one candidate user.

13. The method of claim 9, wherein the processor detecting the relative location of the user comprises receiving a communication signal from a portable communication device that is being worn or carried by the user.

14. The method of claim 9, wherein the processor detecting the relative location of the user comprises:
one or more microphones detecting an angular direction to an audio source; and
the processor that is electronically connected to the one or more microphones detects the relative location of the user by receiving the angular direction based on a verbal utterance from the user that is detected by the one or more microphones.

15. The method of claim 9, further comprising:
a measuring equipment mapping color shift and brightness of pixel display components of the display as a function of viewing angle; and
the measuring equipment generating more than one three-dimensional (3D) look up table (LUT) of compensation values for color management of the pixel display components, each 3D LUT corresponding to a selected viewing angle and one of the 3D LUT comprises the accessed color point control data that is associated with the selected viewing angle of the allocated field of view.

16. The method of claim 9, wherein the display comprises a curved display panel.

\* \* \* \* \*